United States Patent [19]

Rush et al.

[11] Patent Number: 4,646,787
[45] Date of Patent: Mar. 3, 1987

[54] PNEUMATIC PIPE INSPECTION DEVICE

[75] Inventors: William F. Rush, Chicago; James E. Huebler, Brookfield; Christopher J. Ziolkowski, Chicago, all of Ill.

[73] Assignee: Institute of Gas Technology, Chicago, Ill.

[21] Appl. No.: 712,789

[22] Filed: Mar. 18, 1985

[51] Int. Cl.⁴ .......................... F16L 55/12; F16L 55/00
[52] U.S. Cl. ..................................... 138/98; 73/40.5 R; 73/432.1; 138/93; 138/97; 104/155; 104/138.2
[58] Field of Search ............ 73/432 G, 432 B, 432 R, 73/623, 40.5 R; 138/93, 90, 97; 324/220; 358/100, 98, 107; 378/60; 33/125 B, 302, 1 H, 141 G, 529; 105/365; 104/138 R, 138 G, 287, 295, 296, 297, 154, 155, 156

[56] References Cited

U.S. PATENT DOCUMENTS

| | | | |
|---|---|---|---|
| 2,192,155 | 2/1940 | Schuldt | 73/40.5 R |
| 2,975,637 | 3/1961 | Burdick | 73/40.5 R X |
| 3,381,714 | 5/1968 | Johnson | 73/40.5 R X |
| 3,495,546 | 2/1970 | Brown et al. | 73/432 B X |
| 3,902,528 | 9/1975 | Tartabini et al. | 138/90 |
| 4,000,655 | 1/1977 | Jones | 73/432 G |
| 4,067,349 | 1/1978 | Austin et al. | 73/40.5 R X |
| 4,070,904 | 1/1978 | Vanderlans | 73/40.5 R |
| 4,369,713 | 1/1983 | Richardson | 104/138 G |
| 4,372,161 | 2/1983 | de Buda et al. | 73/432 G |
| 4,403,551 | 9/1983 | Slight | 104/138 G |

FOREIGN PATENT DOCUMENTS

| | | | |
|---|---|---|---|
| 110032 | 9/1981 | Japan | 73/40.5 R |
| 127859 | 4/1950 | Switzerland | 73/40.5 R |
| 762629 | 11/1956 | United Kingdom | 73/40.5 R |
| 1044201 | 9/1966 | United Kingdom | 104/138 G |
| 755721 | 8/1980 | U.S.S.R. | 104/155 |
| 1043558 | 9/1983 | U.S.S.R. | 73/432 G |

Primary Examiner—Stewart J. Levy
Assistant Examiner—Tom Noland
Attorney, Agent, or Firm—Allegretti, Newitt, Witcoff & McAndrews, Ltd.

[57] ABSTRACT

A pipe worm comprises radially inflatable toroids spaced along an axially inflatable tubular body. The worm inches through piping through sequential inflation and deflation of the toroids and tubular body. The worm includes a fluid supply source, pipe maintenance instrumentation and automatic, semiautomatic or manual controls which are remote, on-board or trailered, as desired. The worm is inexpensive, reliable, capable of turning 90 degree corners, and further uniquely advantageous.

12 Claims, 3 Drawing Figures

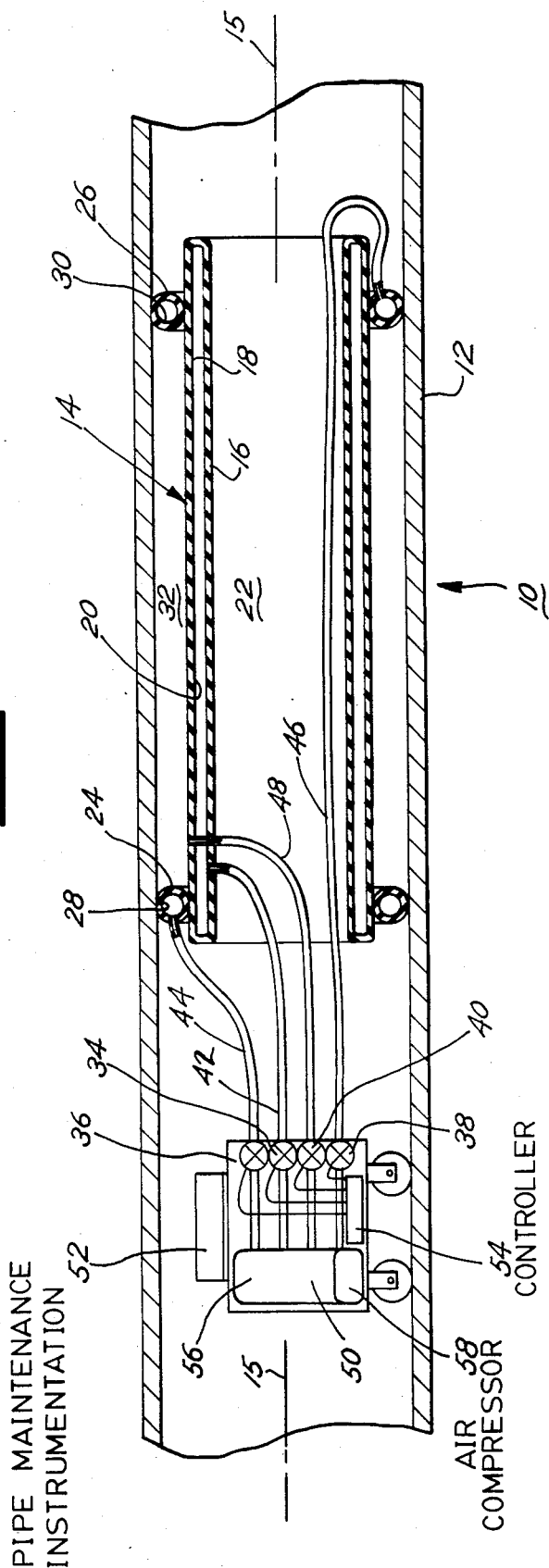

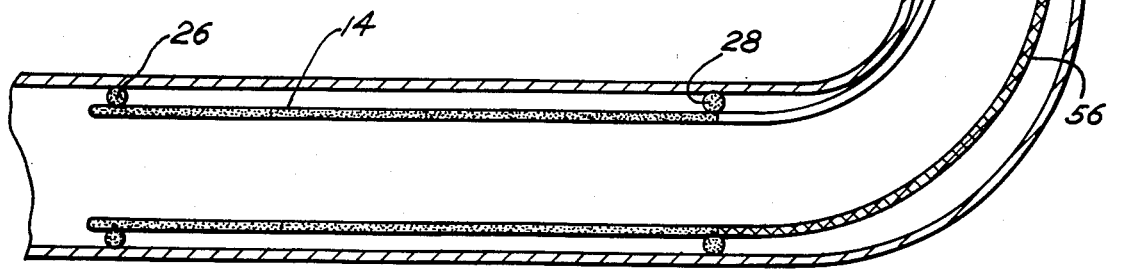
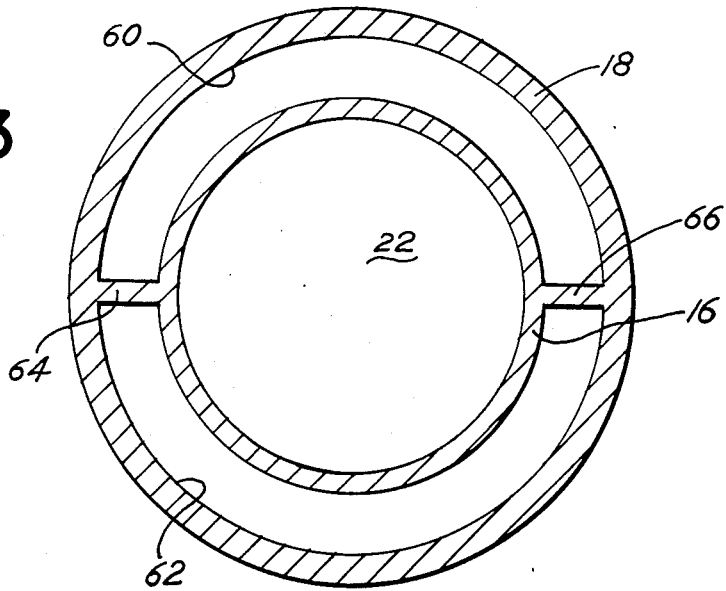

PNEUMATIC PIPE INSPECTION DEVICE

BACKGROUND OF THE INVENTION

This invention relates to devices for the inspection and repair of piping, such as fluid distribution mains, especially including underground natural gas pipelines.

Gas distribution mains typically include many 90 degree corners, and in most of the United States, are of diameters not greater than four (4) inches.

Currently there is no known method of moving inspection and repair instrumentation through a distribution main that makes turning the 90 degree corners possible. This is especially true for mains of diameters four inches or less. Internal inspection of mains is limited to the point of being economically impractical, except with highly specialized equipment in very limited situations. Most of the specialized equipment requires that service to customers be interrupted.

A device known as the Chicago Leak Locator is used by Peoples Coke, Light, and Gas Company of Illinois to find difficult-to-pinpoint leaks in low pressure gas distribution systems. This device is only useful in mains where gas is supplied from both ends of the main, in order to prevent loss of gas service to customers. A stiff sewer rod is required to move the Locator, and the rod does not permit passage of the device around corners in mains.

There are tools available for use inside of mains. However they also suffer from inability to turn corners, which limits the distance the tools can go. AMF Tuboscope has designed and built a model of a survey tool for use in four inch distribution lines. This tool has not met with success, partly because of its inability to turn corners or move past siphon drips and service tees extending into the interior of a main.

SUMMARY OF THE INVENTION

An object of the inventors in making this invention was a device (1) capable of moving through gas distribution piping without stopping the flow of gas in the main, (2) capable of turning corners in the main and moving past services and siphon drips, (3) capable of sealing off sections of the pipe wall and modifying the pressure in that region, (4) capable of carrying or propelling other instrumentation, including visual inspection devices, which can collect, store, analyze and/or relay data, and (5) capable of being selfpropelled or powered externally through tubes and cables stretching from the device to outside the main.

In a first principal aspect, the invention is a pipe worm comprising an axially expandable and retractable first body, and pair of radially expandable and retractable second bodies. The second bodies are mounted axially spaced along the first body. The pipe worm is movable through a pipe through repeated serial expansion of one of the second bodies, retraction of the other of the second bodies, expansion of the first body, expansion of the other of the second bodies, retraction of the one of the second bodies and retraction of the first body.

In another principal aspect, the invention is a fluid inflatable pipe worm comprising a tubular body, a pair of toroids, valving, fluid supply means, and control means. The tubular body is formed with two end-joined, concentric, axially flexible, expandable and retractable cylinders. The cylinders define a tubular inflation compartment therebetween. The tubular body is inflatable through the introduction of fluid into the tubular inflation compartment for axially expanding the cylinders. The tubular body is also deflatable through exhaustion of fluid from the tubular inflation compartment for axially retracting the cylinders.

The pair of radially flexible, expandable and retractable toroids are mounted axially spaced along the exterior of the tubular body. Each toroid defines a toroidal inflation compartment. The toroids are inflatable through the introduction of fluid into the toroidal inflation compartments for radially expanding the toroids. The toroids are also deflatable through exhaustion of fluid from the toroidal inflation compartments for radially retracting the toroids.

The valving operatively connects to the tubular inflation compartment and the toroidal inflation compartments. The valving provides for selective inflation and deflation of the inflation compartments.

The pipe worm is sized for axial placement within the piping. The toroids are sized for worm securing contact of the toroids within the piping during inflation of the toroidal inflation compartments.

The pipe worm is movable within the piping by moving, through repeated serial progression through six step of inflation and deflation of the tubular body and toroids. First, fluid is introduced through the valving into one of the toroidal inflation compartments. This causes inflation of a first of the toroids into worm-securing contact within the piping. Second, fluid is exhausted through the valving from a second of the toroidal inflation compartments, causing deflation of the second toroid, if inflated, and ceasing worm-securing contact of the second toroid. Third, fluid is introduced through the valving into the tubular inflation compartment. The tubular body inflates and axial moves the second toroid away from the first toroid. Fourth, fluid is introduced through the valving into the second toroidal inflation compartment. This causes inflation of the second toroid into worm-securing contact within the piping. Fifth, fluid is exhausted through the valving from within the first toroidal inflation compartment. Exhaustion causes deflation of the first toroid and ceases worm-securing contact of the first toroid within the piping. Finally, fluid is exhausted through the valving from within the tubular inflation compartment. The tubular body is caused to deflate. The deflation causes axial movement of the first toroid toward the second toroid. As a result of repeated serial progression through these six steps, the worm is caused to move through piping.

In the foregoing aspect, the pipe worm is completed by fluid supply means and control means. The control means controls the fluid supply means and the valving for controlled movement of the pipe worm in the manner described.

The invented pipe worm satisfies the foregoing objects and provides many advantages. These advantages and other objects and advantages of the invention are provided in the detailed description, which follows.

BRIEF DESCRIPTION OF THE DRAWING

The accompanying drawing includes three figures or FIGS. as follows:

FIG. 1 is a schematic longitudinal cross-section of the one-section pneumatic worm which is the preferred embodiment of the invention in a pipeline;

FIG. 2 is a schematic longitudinal cross-section of a two-section pneumatic worm, also in a pipeline; and FIG. 3 is a transverse cross-section of a specialized form of the worm.

DETAILED DESCRIPTION OF THE PREFERRED EMBODIMENT

Referring to FIG. 1, the preferred embodiment of the invention is a pneumatic pipe worm generally designated 10 shown cross-sectioned in a cross-sectioned pipe 12. The worm 10 is sized to fit within and inch along the pipe 12, as will be described, for inspection, temporary leak blockage and other maintenance purposes. The worm is controlled remotely or on-board, and may trailer instrumentation or carry the same, also on-board.

The preferred worm 10 includes a first body 14 which is elongated along the axis 15 of the pipe 12, and is both tubular and annular. The first body 14 is composed of two axially elongated, concentric annuluses or cylinders 16, 18 joined at their ends to form a closed annular compartment 20 therebetween. The first body 14 is made of a flexible material, preferably flexible rubber. The first body 14 and its cylinders 16, 18 and compartment 20 are axially expandable and retractable through introduction and exhaustion of air into and from the compartment 20. The material and thickness of the components of the body 14 are selected for desirable expansion and contraction characteristics, and the components are sized and reinforced against radial expansion to assure maintenance of an inflated diameter of the outer cylinder 18 less than the inner diameter of the pipe 12.

The interior of the body 14, i.e., the space radially inward of the inner cylinder 16, is generally void. The inner cylinder and the body 14 thereby define an open passage 22 through the worm 10, from end to end. The passage 22 provides for substantially unobstructed flow through the worm 10 and the pipe 12 with the worm 10 present in the pipe.

In addition to the first tubular body 14, the preferred worm 10 also includes a pair of toroids being a first toroid 24 and a second toroid 26. (A toroid by definition is a body generated by a closed planar surface rotated about a line in the plane of the surface and not intersecting therewith.) The first toroid 24 is mounted to the exterior of the outer cylinder 18 at a first axial (in FIG. 1, left) end. The second toroid 26 is mounted to the exterior of the outer cylinder 18 at a second axial (in FIG. 1, right) end. The toroids 24, 26 are thus mounted axially spaced along the exterior of the tubular body 14.

The toroids 24, 26 are each formed of flexible material, preferably rubber, and each include an annular or toroidal inflation compartment. The compartment of the first toroid 24 is designated a first toroidal compartment 28; the compartment of the second toroid 26 is designated a second toroidal compartment 30. The toroids 24, 26 and the compartments 28, 30 are radially expandable and retractable through introduction and exhaustion, respectively, of air into and from the compartments 28, 30. The material, thickness and size of the toroids 24, 26 are selected for desirable expansion and retraction characteristics, and are reinforced against axial expansion. The toroids 24, 26 are each radially expandable into contact with the interior of the pipe 12, and more particularly, substantially complete circumferential contact. The contact is sufficient to secure the worm in a fixed axial position in the pipe during expansion and retraction of the first body 14.

Valving to the first body and toroids operatively connects to the inflation compartments 20, 28, 30 and to a leak-blocking, exterior compartment 32, to be explained. The valving is trailered, as shown, or on-board the worm, or at a remote control location, as may be appropriate to the environment of worm operation and the desired manner of operation. The valving includes a first body valve 34, a first toroidal compartment valve 36, a second toroidal compartment valve 38, and an exterior valve 40.

The exterior compartment 32 is defined by the exterior of the first body outer cylinder 18, the axially inner sides of the toroids 24, 26 and the inner wall of the pipe 12. Thus, the compartment 32 is exterior to the worm 10.

The valves 34, 36, 38, 40 are operatively connected, as name implies, to compartments 20, 28, 30, 32 via hoses 42, 44, 46, 48. Each valve controls introduction and exhaustion of air into and from its respective compartment. The hoses 42, 44, 46, 48 are connected as shown and are physically separate from the body 14 and toroids 24, 26. Alternatively, the hoses are fixed along their lengths to the body 14, or formed within the walls of the body 14 and toroids 24, 26. All valves 34, 36, 38, 40 are three-way valves for passing air from the supply source to the inflation compartments, venting the compartments to atmosphere, or closing the valve for steady-state operation.

An air supply source 50, pipe maintenance instrumentation 52 and a controller 54 also accompany the worm 10. The source 50, instrumentation 52 and controller 54 are trailered as shown, on-board the worm, or remote therefrom, individually or together, as necessary and desired. The air supply source 50 is a compressed air tank 56 and compressor 58 or such other source as desired. The instrumentation 52 comprises a wireless transmitter and receiver, a worm location signal device, gas meters, visual and infra-red pipe wall inspection devices and the like.

The controller 54 is a valve controller, and an instrumentation controller as desired. The controller 54 is mechanical, electro-mechanical or electronic, as appropriate to application and desires. The controller 54 constitutes a manual and automatic sequencer for a specific sequential or serial operation of the valves 34, 36, 38 and has manual switching means for any desired combination of operations of the valves 34, 36, 38, 40. Worm movement is effected and controlled through the specific sequential operation of the valves, and a specific sequential inflation and deflation of the inflation compartments. In brief, the sequence inflates one toroid into securing contact with the pipe, extends the tubular body to push the other, deflated toroid forward, inflates that other toroid, deflates the first toroid, and deflates the tubular body to pull the first toroid forward. Repetition of this sequence moves the worm forward. Reversal of the sequence moves the worm in reverse.

In greater detail, the controller 54 is preferably capable of automatic sequencing of the valves 34, 36, 38 for forward and reverse worm movement, upon remote command. The controller 54 initiates movements with the tubular body inflated or deflated. The controller is operatively connected to all the valves for operating the valves and sensing valve operating state. The controller initiates movement by recognizing the direction of movement commanded and sensing valve states. The controller then operates the valves in the sequence appropriate to direction of movement and existing valve states, generally following the sequence described briefly above.

As a first specific example, movement is to the right in FIG. 1, the right toroid 26 is in an inflated state, the left toroid is deflated, and the tubular body 14 is deflated. In this situation, the controller 54 initiates worm movement by setting the first toroidal compartment valve 36 to an inflation state. Compressed air from the air supply source 50 flows through the valve 36 into the first toroidal inflation compartment 28. After a pre-set time delay or upon recognition through a pressure sensor of a desired air pressure within the first toroid 24, the valve 36 is switched to a closed state for maintenance of the desired inflation of the toroid 24. At this stage, the left toroid 24 secures or fixes or wedges the left toroid end of the worm in the pipe 12.

The controller 54 next switches the second toroidal compartment valve 38 to a venting state, and the second toroid 26 is deflated. A pre-set time delay passes, or the controller recognizes through another pressure sensor deflation of second toroid 26. The valve 38 is switched closed, and the tubular body valve 34 is switched to the inflation state. The left toroid 24 having inflated and fixed its location, the tubular body 14 inflates through expansion to the right of FIG. 1. The body 14 pushes the right toroid 26 to the right. A pre-set time passes or tubular body inflation is recognized, and the valve 34 is switched to steady state.

The right toroid valve 38 is switched to the inflation state, and the right toroid 26 inflated, in the position to which it was pushed by inflation of the body 14. The right toroid now secures the right end of the worm in the pipe 12.

After a pre-set time or upon pressure sensing, the valve 38 is switched to closed or steady state, and the left toroid valve 36 switched to the deflation state. The left toroid 24 deflates. Again after a pre-set time or upon pressure sensing, the valve 36 is switched closed. The toroid 24 remains deflated.

The tubular body valve 34 is switched to the deflation state, and the body 14 deflated. With the right toroid secured in location, the tubular body 14 deflates through retraction to the right. The body 14 pulls the left toroid 24 to the right. Upon deflation, the valve 34 is closed.

The foregoing sequence has resulted in movement of the worm to the right a distance equal to the difference between the inflated state of the tubular body 14 and the deflated state thereof. Repetition of the sequence results in movement of the worm such longer distances as desired. Thus, the worm 10 is capable of moving to the right (not merely by inches) through the pipe 12. The desired sequence is reversed for movement to the left. The sequence is varied depending upon existing valve states only to the extent that in the initial sequence of steps, the first, first and second, etc. steps may be deleted.

Operation of the exterior valve 40 and inflation of the compartment 32 do not occur during routine movement of the worm 12. The compartment 32 remains deflated and the valve 40 closed. If a pipe leak is known or to be located in the pipe 12, however, the worm is moved to the location of the known or suspected leak. The toroids 24, 26 straddle the leak, one to each side of the leak. Upon command, the controller sets valves 42, 44, 46 or all valves to inflation state and inflates compartments 20, 28, 30 or all the compartments, including the compartment 32. If the leak is to be located, the pressure within the compartment 32 may be varied for pinpointing the leak. Once a leak is located, the securement of the toroids 24, 26 and the presence of the body 14 block the leak and seal it from the remaining pipe 12. As a result, the worm 12 acts as a leak locator and temporary leak block.

The pneumatic worm 10 as now described can turn corners and move past siphon drips and service tees extending into the pipe 12. Because of this and because it pushes and pulls itself to move rather than being pushed by a sewer rod, its distance of travel is much greater than similar devices. It requires less power to operate than a wheel driven ferret and also weighs less, resulting in a longer range than wheel driven ferrets. The worm 10 does not stop flow of gas in the main during operation. If the worm 10 locates a leak, it can be used as a temporary repair because the seals formed by the toroids prevent gas from reaching the leak. Repairs can be made more safely while gas flow is maintained inside the main. The worm 10 can transmit signals to assist surface crews in locating leaks.

The addition of a second tubular body 56 and a third toroid 58 (see FIG. 2) combined with the flexibility of the worm permit turning the sharp 90 degree turns found in common distribution mains and passage past siphon drips. (A siphon drip is a tube passing from top to bottom in the main, bisecting the main. A typical tube diameter is $\frac{3}{8}-\frac{1}{2}$ inches. Siphon tubes are used to remove water and other condensates from the main.) To accomplish these moves, the worm 10 is positioned with the second or center toroid 26 close to the obstacles or turn. The first tubular body 14 or back section is slightly deflated so as to be less than full length. The center and back toroids 24, 26 are inflated and the second tubular body 56 or front section is deflated. Slow inflation of the forward section forces that part of the worm to slide past the obstacle (or around the corner). Once the forward section is nearly fully extended, the end toroid is inflated and the center toroid is deflated. Expanding the rear section while contacting the forward section moves the center toroid past the obstacle. Once past the obstacle, the center toroid is inflated and the back section is shortened by deflation. Continuing the normal moving or walking sequence of the front section pulls the deflated back section around the obstacle, and the pneumatic worm 10 can continue on its way.

Horizontal and vertical turns of the worm 10 are facilitated by radially dividing the concentric cylinders 16, 18 into two or more separate chambers 60, 62 (FIG. 3) with fluid tight, transverse membranes 64, 66. With, for example, two chambers, the membranes permit one side of the concentric cylinder pair to be inflated more fully than the other side, giving rise to a bending in the cylinders and causing the device to turn in the desired direction. Such motion is also preferably controlled by a suitably capable controller 54. The design of the worm 10 is applicable to different diameter pipes by change of toroid and tubular body concentric cylinder diameters. Said worm may also be configured to have two or more driving (center) segments.

In a most preferred embodiment of the invention, the entire pneumatic worm 10 is made of a flexible rubber. Surfaces that wear are covered with a wear-resistant material such as Kevlar TM. The two concentric cylinders 16, 18 are interconnected in several places to prevent the collapse of the inner cylinder 16 while the concentric cylinders are being inflated. One method of interconnection forms independent sections that are independently inflatable to aid in turning corners and moving past obstacles in the main. Deflation of sections of compartments in the worm can cause a collapse of that section. Judicious inflation and deflation of compartments makes passing siphon drips and turning corners easier. Deflation of the whole worm permits insertion into the main through a small opening, such as that for a service tee. There are companies that specialize in making intricate bladders; thus, the pneumatic worm should be inexpensive to manufacture.

The preferred embodiment constitutes the best mode contemplated by the inventors of carrying out the invention. The invention, and the manner and process of making and using it, have been described in full, clear, concise and exact terms to enable any person skilled in the art to make and use the same. Because the invention may be copied without the copying of the precise details of the preferred embodiment, the following claims particularly point out and distinctly claim the subject matter which the inventor regards as his invention and wishes to protect.

What is claimed is:

1. A pipe worm comprising:
an axially expandable and retractable first body; and
a pair of radially expandable and retractable second bodies mounted axially spaced along the first body;
all the bodies being fluid inflatable to be expandable through fluid inflation and being fluid deflatable to be retractable through fluid deflation; and further comprising means for controlling all the bodies for automatically causing the following sequentially ordered series of steps: expansion of one of the second bodies, retraction of the other of the second bodies, expansion of the first body, expansion of the other of the second bodies, retraction of the one of the second bodies, and retraction of the first body.

2. A pipe worm as in claim 1 in which the first body defines an open passage through the worm, the worm thereby providing flow through a pipe with the worm present in the pipe.

3. A pipe worm as in claim 1 in which the first body comprises two end-joined, concentric, axially flexible cylinders.

4. A pipe worm as in claim 3 in which the cylinders are formed of rubber.

5. A pipe worm as in claim 1 in which the second bodies comprise toroids.

6. A pipe worm as in claim 5 in which the toroids are formed of rubber.

7. A fluid inflatable pipe worm for maintenance of piping comprising:
a first body formed with two end-joined, concentric, axially flexible, expandable and retractable cylinders defining a first body inflation compartment therebetween, the first body being inflatable through the introduction of fluid into the first body inflation compartment for axially expanding the cylinders, and being deflatable through exhaustion of fluid from the first body inflation compartment for axially retracting the cylinders;
a pair of second bodies formed with radially flexible, expandable and retractable toroids mounted axially spaced along the exterior of the first body and defining a toroidal inflation compartment, the second bodies being inflatable through the introduction of fluid into the toroidal inflation compartments for radially expanding the toroids, and being deflatable through exhaustion of fluid from the toroidal inflation compartments for radially retracting the toroids; and
valving operatively connecting to the first inflation compartment and the toroidal inflation compartments for selective inflation and deflation of the inflation compartments;
the pipe worm being sized for axial placement within the piping and for worm securing contact of the second bodies within the piping during inflation of the toroidal inflation compartments; and
the pipe worm being movable within the piping by moving through repeatedly performing the following series of steps: (a) introduction of fluid through the valving into one of the toroidal inflation compartments causing inflation of one of the second bodies into worm securing contact within the piping, (b) exhaustion of fluid through the valving from the other of the toroidal inflation compartments, causing deflation of the other of the second bodies if inflated, and its ceasing worm-securing contact, (c) introduction of fluid through the valving into the first body inflation compartment causing inflation of the first body and axial movement of the other of the second bodies away from the one of the second bodies, (d) introduction of fluid through the valving into the other of the toroidal inflation compartments causing inflation of the other of the second bodies into worm securing contact within the piping, (e) exhaustion of fluid through the valve from within the one toroidal inflation compartment causing deflation of the one second body and ceasing worm-securing contact of the one second body, within the piping, (f) exhaustion of fluid through the valving from within the first body inflation compartment causing deflation of the first body and axial movement of the one second body toward the other of the second bodies.

8. A fluid inflatable pipe worm for maintenance of piping comprising:
a tubular body formed with two end-joined, concentric axially flexible, expandable and retractable cylinders defining a tubular inflatable compartment therebetween, the tubular body being inflatable through the introduction of fluid into the tubular inflation compartment for axially expanding the cylinders, and being deflatable through exhaustion of fluid from the tubular inflation compartment for axially retracting the cylinders;
a pair of radially flexible, expandable and retractable toroids mounted axially spaced along the exterior of the tubular body and each defining a toroidal inflation compartment, the toroids being inflatable through the introduction of fluid into the toroidal inflation compartments for radially expanding the toroids, and being deflatable through exhaustion of fluid from the toroidal inflation compartments for radially retracting the toroids; and
valving operatively connecting to the tubular inflation compartment and the toroidal inflation compartments for selective inflation and deflation of the inflation compartments;
the pipe worm being sized for axial placement within the piping and for worm securing contact of the toroids within the piping during inflation of the toroidal inflation compartments; and
the pipe worm being movable within the piping by moving through repeatedly performing the following series of steps: (a) introduction of fluid through the valving into a first one of the toroidal inflation compartments causing inflation of a first of the two toroids into worm securing contact within the piping, (b) exhaustion of fluid through the valve from a second of the toroidal inflation compartments, causing deflation of the second toroid if inflated, and ceasing worm-securing contact of the second toroid, (c) introduction of fluid through the valving into the tubular inflation compartment causing inflation of the tubular body and axial movement of the second toroid away from the first toroid, (d) introduction of fluid through the valving into the second toroidal inflation compartments causing inflation of the second toroid into worm securing contact within the piping, (e) exhaustion of fluid through the valving from within the first toroidal inflation compartment causing deflation of the first toroid and ceasing worm-securing contact of the first toroid within the piping, (f) exhaustion of fluid through the valving from within the tubular inflation compartment causing deflation of the tubular body and axial movement of the first toroid toward the second toroid.

9. A fluid inflatable pipe worm as in claim 8 further comprising:

fluid supply means for supplying fluid to the valving; and control means for controlling the fluid supply means and valving for controlled movement of the pipe worm.

10. A fluid inflatable pipe worm as in claim 9 in which the valving, fluid supply means and control means are mounted to the pipe worm for movement with the pipe worm within the piping.

11. A fluid inflatable pipe worm as in claim 8 in which the inflation compartments are pneumatic compartments and the pipe worm is a pneumatic pipe worm.

12. A fluid inflatable pipe worm as in claim 8, the tubular body and toroids and piping axially between the toroids defining, when the toroids are inflated, a leak stopping inflation compartment, the valving operatively connected to the leak stopping inflation compartment, whereby the pipe worm is positionable and the leak stopping inflation compartment inflatable for stopping leaks in the piping axially between the toroids.

* * * * *